F. C. KNAPIK.
TOE BOLT.
APPLICATION FILED JAN. 29, 1920.

1,400,364.

Patented Dec. 13, 1921.

Inventor,
Frank C. Knapik,
By Henry J. Brewington.
Attorney.

UNITED STATES PATENT OFFICE.

FRANK C. KNAPIK, OF BALTIMORE, MARYLAND.

TOE-BOLT.

1,400,364.  Specification of Letters Patent.  Patented Dec. 13, 1921.

Application filed January 29, 1920. Serial No. 354,860.

*To all whom it may concern:*

Be it known that I, FRANK C. KNAPIK, a citizen of the United States, residing at Baltimore city, State of Maryland, have invented certain new and useful Improvements in Toe-Bolts, of which the following is a specification.

The bolt which is the subject matter of the present application for patent has been designed more particularly for use in places where it is impossible to insert an ordinary headed bolt from the rear of the parts to be fastened thereby, and the invention has for its object to provide a bolt of novel and improved design which can be readily inserted through a bolt hole from the front, and which will hold the parts to be fastened together as firmly as an ordinary headed bolt.

With the object stated in view, the invention consists in a novel combination and arrangement of parts to be hereinafter described and claimed, and in order that the same may be better understood, reference is had to the accompanying drawing forming a part of this specification.

Figure 1:
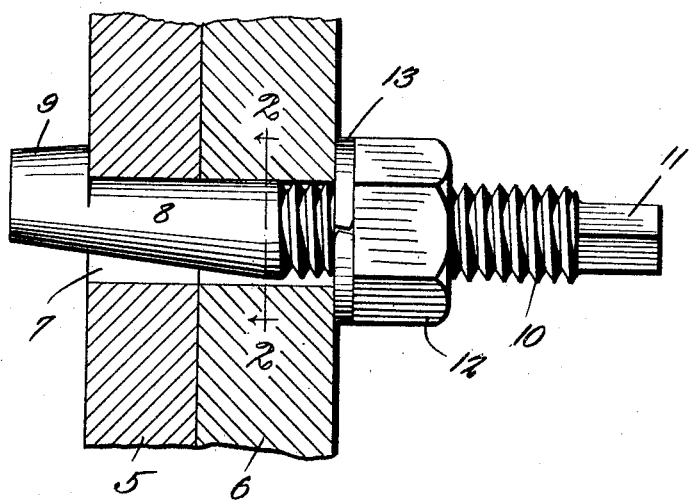
Figure 2:
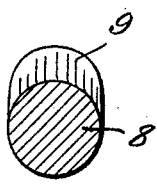

In the drawing, Figure 1 is an elevation of the bolt, with the parts through which it passes shown in section, and Fig. 2 is a cross-section of the bolt on the line 2—2 of Fig. 1.

Referring specifically to the drawing, 5 and 6 denote two plates or other members to be fastened together by one or more bolts. The drawing shows one bolt as this suffices to illustrate the invention. The bolt hole in the parts 5 and 6 is shown at 7.

The bolt which is the subject matter of the present application for patent consists of a shank 8 provided with a head 9 at one end, and having its other end threaded as shown at 10, and terminating in a short angular portion 11. On the threaded portion of the bolt shank is shown a nut 12, and under the latter seats a spring lock washer 13.

The unthreaded portion 8 of the bolt shank is not of uniform diameter throughout its entire length, but it is gradually reduced in diameter, or tapered, in the direction of the head 9. This taper or reduction is on one side of the shank only, so that here the side of the shank is not parallel to its longitudinal axis, but is inclined thereto, as clearly shown in Fig. 1. The head 9 projects laterally from one side of the bolt shank only, this being the side diametrically opposite the tapered side. The width of the head 9 also does not exceed the diameter of the bolt hole 7.

Referring to Fig. 1 it will be evident that the bolt can be readily inserted through the bolt hole 7 from the front end thereof. This is done by tilting or canting the bolt and passing it through the bolt hole obliquely. The extent to which the bolt can be tilted depends on the amount of taper of the part 8, and this will vary with the size of the bolt. When the bolt is tilted as described, its head 9 can pass through the hole 7, and when the head emerges from the rear end of the hole, the bolt can be straightened out to occupy its proper position in the bolt hole, as shown in Fig. 1. The nut 12 and the washer 13 may then be applied to complete the fastening. The squared end 11 of the bolt permits the application of a wrench to prevent the bolt from turning while the nut 12 is being screwed up.

A bolt constructed as hereinbefore described can be easily and quickly applied, and it makes a fastening which is in all respects as firm and rigid as that which is obtained by any ordinary bolt.

I claim:

A bolt comprising a shank and a head on one end thereof, said head projecting from one side of the shank only and its width not exceeding the diameter of the shank, the shank being inclined to its longitudinal axis on one side to obtain a taper in the direction of the head, and said head projecting from that side of the shank which is diametrically opposite the inclined side.

In testimony whereof I affix my signature.

FRANK C. KNAPIK.